US008515080B2

(12) United States Patent
DeCusatis et al.

(10) Patent No.: US 8,515,080 B2
(45) Date of Patent: Aug. 20, 2013

(54) METHOD, SYSTEM, AND COMPUTER PROGRAM PRODUCT FOR ENCRYPTION KEY MANAGEMENT IN A SECURE PROCESSOR VAULT

(75) Inventors: Casimer M. DeCusatis, Poughkeepsie, NY (US); Lawrence Jacobowitz, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1091 days.

(21) Appl. No.: 11/959,560

(22) Filed: Dec. 19, 2007

(65) Prior Publication Data

US 2009/0161877 A1    Jun. 25, 2009

(51) Int. Cl.
*H04L 9/08* (2006.01)

(52) U.S. Cl.
USPC ............................ 380/282; 380/30; 380/44

(58) Field of Classification Search
USPC .............................. 380/30, 44, 282
See application file for complete search history.

(56) References Cited

U.S. PATENT DOCUMENTS

| | | | |
|---|---|---|---|
| 6,061,671 A | 5/2000 | Baker et al. | |
| 6,141,756 A * | 10/2000 | Bright et al. | 726/22 |
| 6,201,871 B1 | 3/2001 | Bostley, III et al. | |
| 6,311,270 B1 * | 10/2001 | Challener et al. | 713/169 |
| 6,370,250 B1 | 4/2002 | Stein | |
| 6,795,920 B1 | 9/2004 | Bacha et al. | |
| 6,996,547 B1 | 2/2006 | Tugenberg et al. | |
| 7,000,115 B2 | 2/2006 | Lewis et al. | |
| 7,370,210 B2 * | 5/2008 | Symes | 713/189 |
| 7,673,152 B2 * | 3/2010 | Shirakawa et al. | 713/189 |
| 7,770,018 B2 * | 8/2010 | Fiske | 713/182 |
| 7,865,733 B2 * | 1/2011 | Goto et al. | 713/176 |
| 2002/0184046 A1 | 12/2002 | Kamada et al. | |
| 2005/0071656 A1 | 3/2005 | Klein et al. | |
| 2005/0240991 A1 | 10/2005 | Dombkowski et al. | |
| 2006/0015748 A1 | 1/2006 | Goto et al. | |
| 2008/0034440 A1 * | 2/2008 | Holtzman et al. | 726/27 |

OTHER PUBLICATIONS

Kim, HoWon, et al.: Design and Implementation of a Private and Public Key Crypto Processor and Its Application to a Security System, IEEE Transactions on Consumer Electronics, vol. 50., No. 1, Feb. 2004, pp. 214-224.
Force Sr., Gordon: Portable Data Encryption Approaches, National Semiconductor Corporation, pp. 413-419.
Sarker, Mohammad et al: A Cost Effective Symmetric Key Cryptographic Algorithm for Small Amount of Data, Department of CSE, East West University, 43, Mohakhali, Dhaka-1212, Bangladesh, 6 pages.

* cited by examiner

*Primary Examiner* — Amare F Tabor
(74) *Attorney, Agent, or Firm* — Cantor Colburn LLP; Steven Chiu

(57) ABSTRACT

A method for encryption key management including accepting authenticated unencrypted data into a processor of a server computing device that is configured as a private key secure processor vault, the operation of which is isolated from other components of the server computing device thereby preventing unauthorized access to the processor and the data contents therein; encrypting the authenticated unencrypted data based on an existing private key stored in the processor thereby converting it to encrypted data; and transmitting the encrypted data out of the processor. A system and computer program product is also provided.

15 Claims, 6 Drawing Sheets

METHOD, SYSTEM, AND COMPUTER PROGRAM PRODUCT FOR ENCRYPTION KEY MANAGEMENT IN A SECURE PROCESSOR VAULT

BACKGROUND OF THE INVENTION

1. Field of the Invention

This invention relates generally to secure data transmission, and particularly to a method, system, and computer program product for encryption key management in a secure processor vault.

2. Description of Background

Secure data transmission, for example, via the internet or wireless communications networks, is important in many applications, including enterprise uses (e.g., by financial organizations, retailers, etc.), high-performance computing uses (e.g., by government entities, national laboratories, etc.), and small business or consumer uses (e.g., by online game providers and players). A popular approach to secure data transmission is encryption of the data for transmission between trusted devices (e.g., computers), which are equipped with information (or "keys") to encrypt and/or decrypt the data for use in programs. Furthermore, in addition to encryption, an approach of isolating the program using the secure data (e.g., an account access, information management, or game program) from other programs on a trusted device is also popular. Typically, these approaches are accomplished through software (e.g., by other programs).

An improved approach for program isolation has emerged that utilizes hardware (e.g., a multi-core computer processing unit) to overcome vulnerabilities of software to data security attacks. For example, where software can be compromised (e.g., by a virus, hacking, or other undesirable activity) to gain access to secure data on a trusted device, hardware can be configured as a virtual "vault" that is immune to such attacks. In this approach, the encryption keys are stored in the vault, data that is pre-encrypted by the keys can enter the vault for decryption and manipulation by the isolated program, and data that is encrypted (or re-encrypted) by the keys can leave the vault for transmission to other trusted devices. However, it is desirable to utilize the improved security benefits of the hardware vault for so-called public key programs that do not have access to the "private" keys isolated in the vault to pre-encrypt data for entry into the vault.

SUMMARY OF THE INVENTION

A method, system, and computer program product for encryption key management in a secure processor vault is provided. The method includes accepting authenticated unencrypted data into a processor of a server computing device that is configured as a private key secure processor vault, the operation of which is isolated from other components of the server computing device thereby preventing unauthorized access to the processor and the data contents therein; encrypting the authenticated unencrypted data based on an existing private key stored in the processor thereby converting it to encrypted data; and transmitting the encrypted data out of the processor. A corresponding system and computer program product is also provided.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

According to exemplary embodiments of the invention described herein, a method, system, and computer program product for encryption key management in a secure processor vault is provided. In accordance with such exemplary embodiments, public key programs can be operated on a secure processor vault server platform in a client-server network while maintaining the strong security obtained with private key programs in such environment, thereby allowing data transmission and encryption key generation and distribution in a very secure manner.

Figure 1:
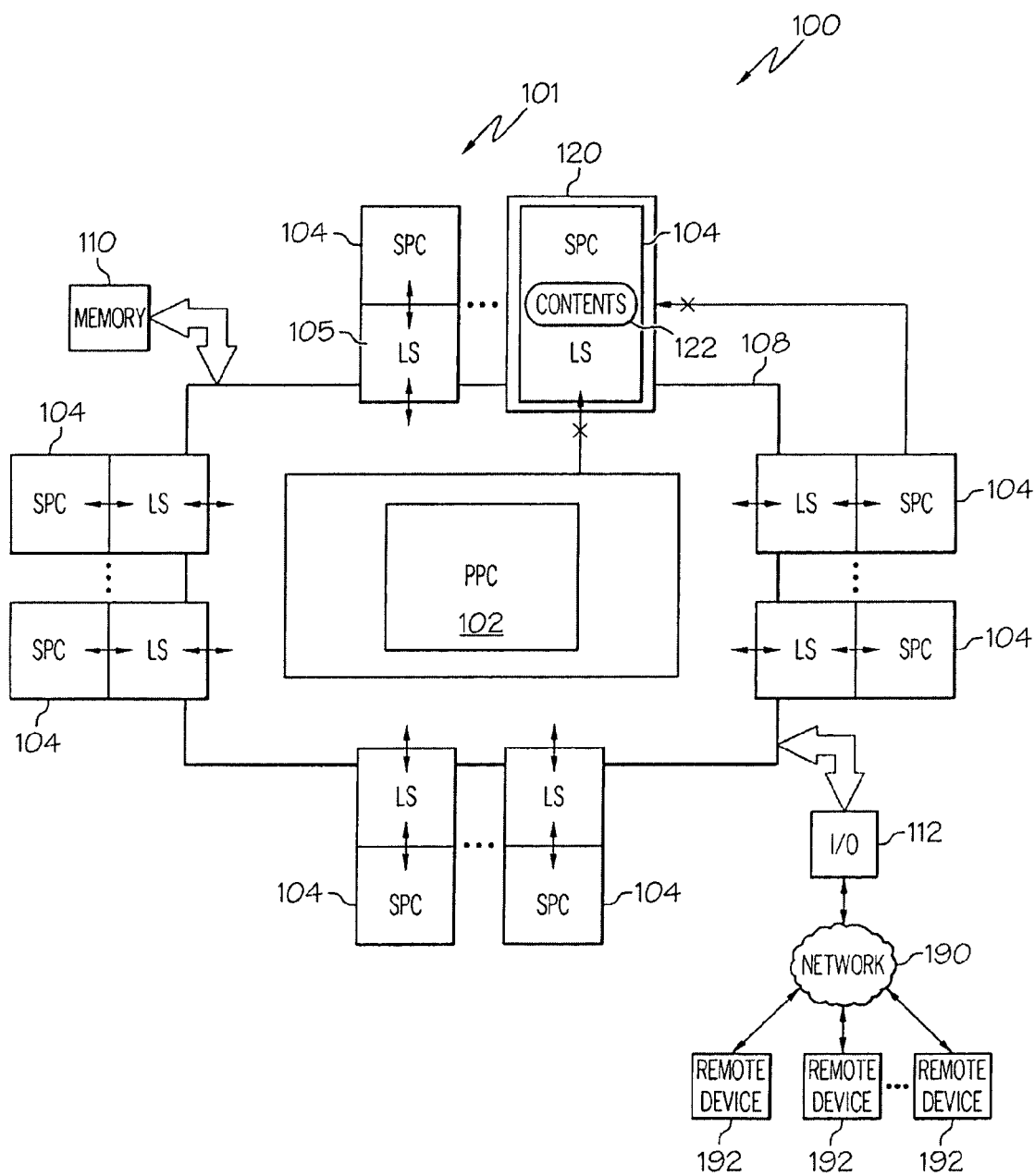
FIG. 1 illustrates an example of a computer hardware architecture for encryption key management in a secure processor vault.

Turning now to the drawings in greater detail, wherein like reference numerals indicate like elements, FIG. 1 illustrates an example of a computer hardware architecture 100 for encryption key management in a secure processor vault. The exemplary architecture includes a processor 101, which may be a multi-core computer processing unit or multi-core processor ("MCP"). The MCP 101 includes a primary processor core ("PPC") 102 and a plurality of synergistic processor cores ("SPCs") 104 that are in communications via a core interconnect bus ("CIB") 108. Each SPC 104 includes a dedicated local storage memory ("LSM") 105. The PPC 102 performs a supervisory role of the MCP 101, and the SPC's 104 perform computational roles, which they can do independent of each other to provide multi-processing functionality. The MCP 101 is in communications with one or more memory elements 110 and one or more input/output elements 112 via interconnections to the CIB 108.

An SPC 104 can also operate in an isolated mode from the rest of the components of the MCP to provide a secure processor "vault" 120. For example, when an SPC 104 operates as a vault 120, it cannot be accessed (e.g., for input or output of data) by other SPC's 104 or the PPC 102 (e.g., as indicated in FIG. 1), except that the PPC 102 can cancel the operation of the SPC vault 120 upon which the data and/or program contents 122 of the vault 120 are securely destroyed. Thus, the SPC vault 120 provides a hardware-centric secure processing environment that is immune to penetration or attacks (e.g., viruses, hacking, etc.) that impact software-centric security schemes.

The data and/or program contents 122 of the vault 120 can include components for encryption of data to provide secure data transmission, for example, to remote computers 192 via a communications medium 190 such as the internet or a wireless communications network. Such components may include one or more data encryption programs and one or more data encryption keys. Other such components may include one or more encryption key generation programs for generating new encryption keys.

Figure 2:
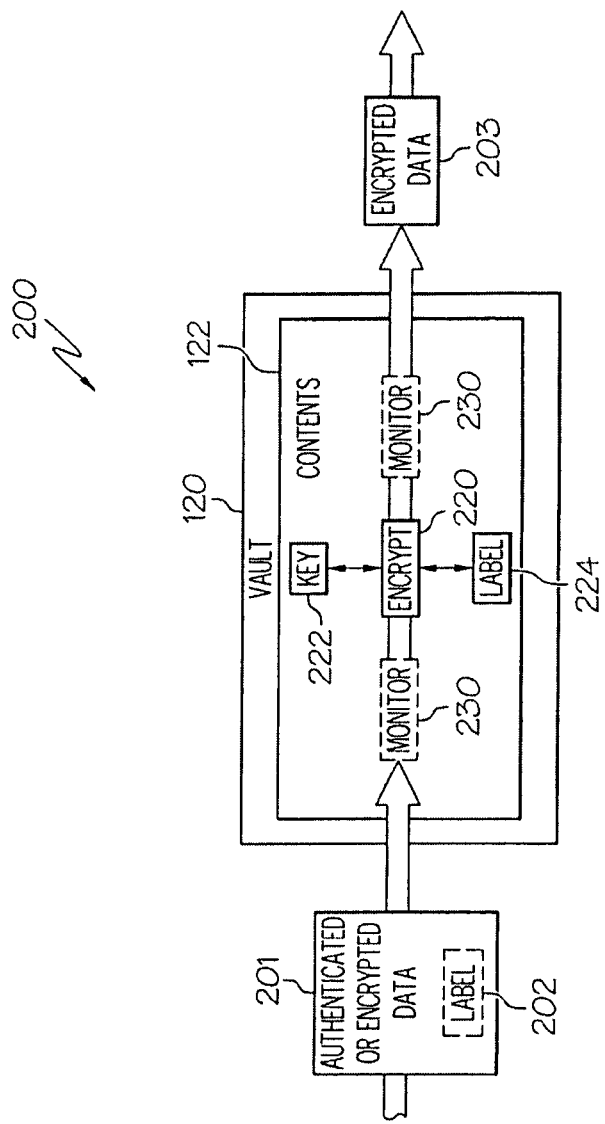
FIG. 2 illustrates an example of a computer software architecture for encryption key management in a secure processor vault operable on the computer hardware architecture of FIG. 1.

FIG. 2 illustrates an example of a computer software architecture 200 for encryption key management in a secure processor vault operable on the computer hardware architecture 100 of FIG. 1. The exemplary software architecture 200 includes data and/or program contents 122 within an SPC 104 configured as a secure processor vault 120 (depicted for reference). For example, the contents 122 includes an encryption module 220 that is operable to encrypt data. The contents 122 also includes a key module 222 in communications with the encryption module 220. The key module 222 may include encryption key data and/or be operable to generate encryption keys for use by the encryption module 220.

The contents 122 also includes a label module 224, which can be operable to add or remove an authentication label from data that enters and/or exits the secure processor vault 120. In some embodiments, the contents 122 can also include a monitoring module 230. The monitoring module 230 can be operable to monitor the entry and exit of data with respect to the vault 120 to, for example, insure a one-to-one correspondence of data-flow for security purposes.

Figure 3:
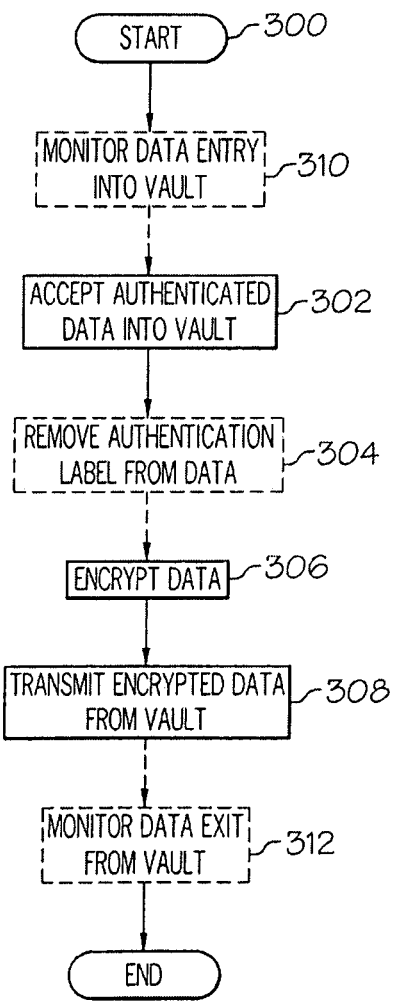
FIG. 3 illustrates an example of a method for encryption key management in a secure processor vault, executable through the computer software architecture of FIG. 2, in which authenticated data is encrypted.

FIG. 3 illustrates an example of a method 300 for encryption key management in a secure processor vault 120, executable, for example, through the computer software architecture 200 of FIG. 2, in which authenticated data is encrypted. In block 302, authenticated data 201 is received or accepted in the secure processor vault 120. The vault 120 is configured to accept authenticated data 201 as well as data encrypted according to secure or private key data, e.g. contained in the key module 222. Thus, data that is not encrypted according to the vault private key may still be allowed to enter the vault 120 if it has been authenticated, for example, in accordance with an accepted guideline or policy. Authenticated data 201 may be identified and/or distinguished from other unencrypted data by an identifier or label included with the data (e.g., appended in one or more bits). Acceptable labels may be contained, for example, in the label module 224 for comparison to determine whether labeled data is authenticated to enter the vault 120.

In some embodiments, if an authentication label is included with the authenticated data 201, the label is removed from the authenticated data 201 in the vault 120 in block 304. This label removal from the authenticated data 201 may be performed, for example, by the label module 224. In block 306, the data is encrypted. This encryption may be performed, for example, by the encryption module 220 based on encryption key data from the key module 222. Furthermore, the encryption may be performed after the data has been used, processed, etc. by another program operating in the vault 120.

In block 308, the encrypted data 203 is transmitted from the vault 120. The encrypted data 203 may be transmitted from a local vault (e.g., on a server device 100) to a remote vault (e.g., on a client device 192), for example, via the input/output elements 112, where it can be used, processed, etc. In some embodiments, blocks 310 and 312 may also be performed in the method 300. In block 310, data entry into the vault 120 is monitored, and in block 312, data exit from the vault 120 is monitored. This monitoring may be performed, for example, by the monitoring module 230. The monitoring can provide an added security measure to the operation of the vault 120, for example, considering the entry of unencrypted authenticated data 201, by insuring a one-to-one correspondence of data entering and leaving the vault. For example, when authenticated data 201 is accepted into the vault, this monitoring can insure that corresponding encrypted data 203 is transmitted from the vault 120, and if not, that a security violation is recognized, which may result in the deletion of the accepted data 201 and/or the termination of the vault operation.

Figure 4:
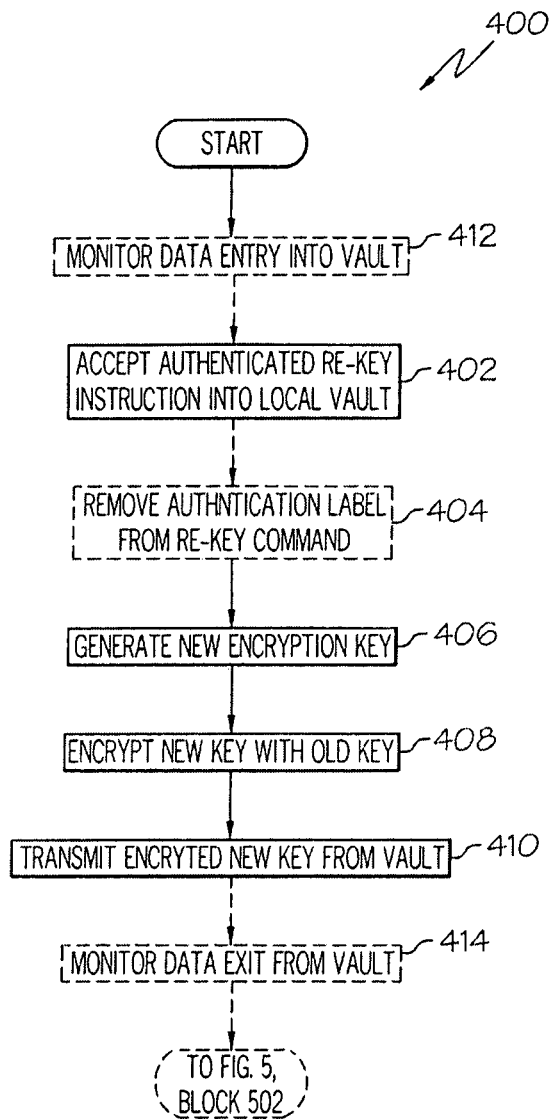
FIG. 4 illustrates an example of a method for encryption key management in a secure processor vault, executable through the computer software architecture of FIG. 2, in which a re-key operation is initiated.

FIG. 4 illustrates an example of a method 400 for encryption key management in a secure processor vault 120, executable, for example, through the computer software architecture 200 of FIG. 2, in which a re-key (i.e., key replacement) operation is initiated. In block 402, authenticated data 201 that represents a re-key instruction (e.g., a command or request) is accepted into a local vault 120 according to the same or similar details as described for block 302. For example, a re-key request may be received from a remote device 192 or a re-key command may be received from the local device 100. In some embodiments, if an authentication label is included with the re-key instruction data 201, the label is removed from the re-key instruction data 201 in block 404 according to the same or similar details as described for block 304.

In block 406, a new encryption key is generated. This creation of a new key may be performed, for example, by the key module 222. Furthermore, the new key may be generated using a private key encryption algorithm, such as data encryption standard (DES), advanced encryption standard (AES), etc., which may also be the same algorithm by which the previous key was generated. In block 408, the new key data is encrypted according to the old (e.g., existing or previous) key. This encryption may be performed, for example, by the encryption module 220 according to encryption key data from the key module 222. In some embodiments the new key data may also or alternatively be labeled for authentication by the label module 224, for example, for entry into a remote vault 120 that does not include the old key data.

In block 410, the encrypted new key data 203 is transmitted from the vault 120 according to the same or similar details described for block 308. Furthermore, in some embodiments, the entry and exit of the re-key instruction and new key data from the vault 120 is monitored in blocks 412 and 414, respectively, according to the same or similar details described for blocks 310 and 312. Additionally, in some embodiments, the method 400 may continue from block 410 or 414 to block 502 of FIG. 5.

Figure 5:
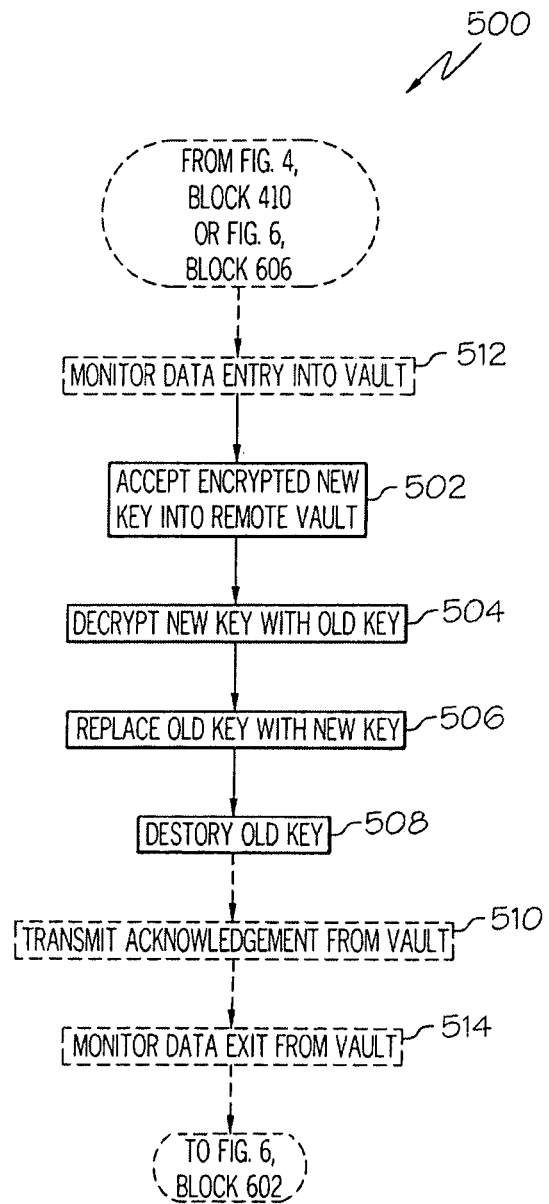
FIG. 5 illustrates an example of a method for encryption key management in a secure processor vault, executable through the computer software architecture of FIG. 2, in which a re-key operation is completed.

FIG. 5 illustrates an example of a method 500 for encryption key management in a secure processor vault 120, executable, for example, through the computer software architecture 200 of FIG. 2, in which a re-key operation is completed. In some embodiments, this method 500 may continue from block 410 or 414 of FIG. 4 or from block 606 of FIG. 6. In block 502, an encrypted new key 201 (e.g., that was transmitted in block 410) is accepted in the vault 120 of a remote device 192, such as a client computer in a client-server network. In some embodiments the encrypted key data 201 may also or alternatively be authenticated as indicated by a label included with (e.g., appended to) the data.

In block 504, the new key data 201 is decrypted with the old key. This may be performed, for example, by the encryption module 220 using old encryption key data from the key module 222 (i.e., on a remote device 192). Furthermore, in some embodiments, if the encrypted new key 201 includes an authentication label, it may be removed, for example, by the label module 214 at some point with respect to the decryption (e.g., before, during, or after). In block 506, the old key is replaced with the new key. For example, the decrypted new key data may be stored in the key module 222 in place of the old key data.

In block 508, the old key is destroyed. This may also be performed by the key module 222. In some embodiments, an acknowledgement is transmitted from the remote device 192 in block 510 to, for example, the vault 120 of the local device 100 to confirm the re-key operation was completed. Furthermore, in some embodiments, the entry and exit of the encrypted new key data and the corresponding acknowledgment from the vault 120 is monitored in blocks 512 and 514, respectively, according to the same or similar details described for blocks 310 and 312. Additionally, in some embodiments, the method 500 may continue from block 510 or 514 to block 602 of FIG. 6.

Figure 6:
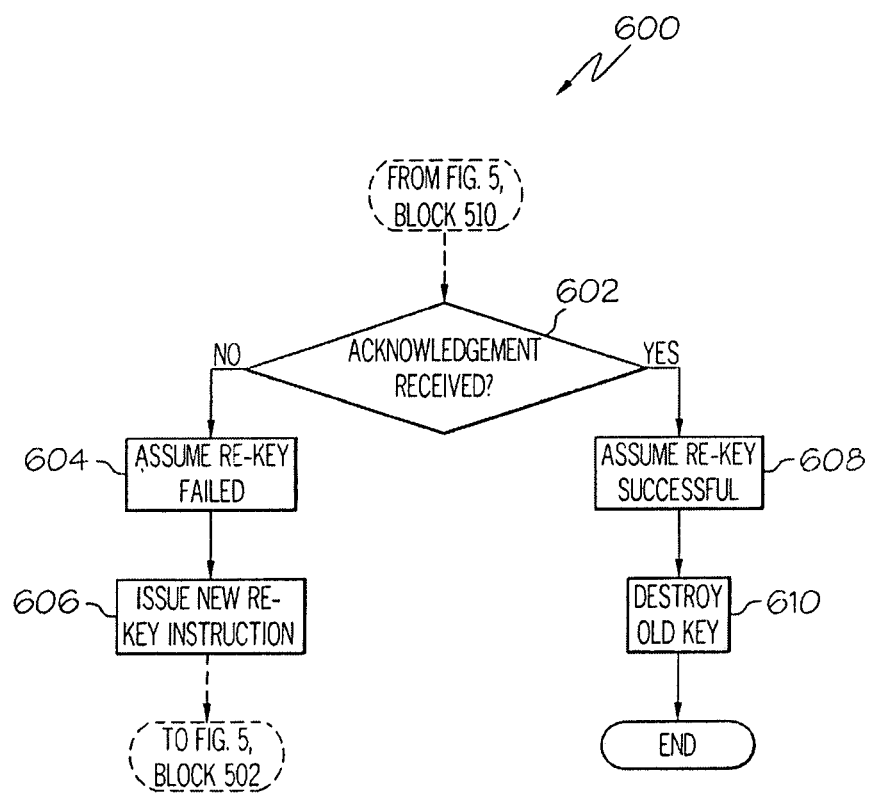
FIG. 6 illustrates an example of a method for encryption key management in a secure processor vault, executable through the computer software architecture of FIG. 2, in which a re-key operation is confirmed.

FIG. 6 illustrates an example of a method 600 for encryption key management in a secure processor vault 120, executable, for example, through the computer software architecture 200 of FIG. 2, in which a re-key operation is confirmed. This method 600 of confirming the re-key operation can provide another additional security measure for data transmission in the network 190. In some embodiments, this method 600 may continue from block 510 of FIG. 5. In block 602, the receipt of an acknowledgment (e.g., that was transmitted in block 510) from a remote device 192 is monitored by the local device 100 (e.g., a server or host). This receipt may be monitored, for example, by the monitoring module 230 or another module within the data and/or program contents 122 of the vault 120.

If the acknowledgement is not received, the method 600 proceeds with block 604 in which the local device 100 assumes that (e.g., operates as if) the re-key operation to the remote device 192 failed, which may, for example, be the result of an unintentional occurrence (e.g., network delay) or an intentional occurrence (e.g., a virus, hacking, or other malicious activity). As a result, for example, the local device 100 may operate under the assumption that the remote device 192 from which the acknowledgment receipt failed cannot be trusted (e.g., to accept data from) until a successful re-key operation is confirmed. In block 606, the local device 100 issues a new re-key instruction, which, for example, can result in the repeat of the method 500 of FIG. 5.

If the acknowledgement is received, the method 600 proceeds with block 608 in which the local device 100 assumes that the re-key operation to the remote device 192 was successful. As a result, for example, the local device 100 can operate under the assumption that the remote device 192 from which the acknowledgment was received can be trusted. In block 610, the old key is destroyed, for example, by the encryption module 220 and/or key module 222 of the local device 100.

In some embodiments, the local device 100 may monitor for receipt of the acknowledgment (e.g., in block 602) from the remote device 192 with respect to one or more conditions, such as within a certain time duration after the encrypted new key has been transmitted. In such examples, if the acknowledgement is not received by the local device 100 within the parameters of the condition (e.g., within a certain time limit), the local device will respond as if the acknowledgment was not received, for example, as described for blocks 604 and 606.

The exemplary hardware architecture 100 and software architecture 200 are illustrated and described with respect to various components, modules, etc. for exemplary purposes. It should be understood that other variations, combinations, or integrations of such elements that provide the same features, functions, etc. are included within the scope of embodiments of the invention.

The flow diagrams depicted herein are just examples. There may be many variations to these diagrams or the blocks (or operations) described therein without departing from the spirit of embodiments of the invention. For instance, the blocks may be performed in a differing order, or blocks may be added, deleted or modified. All of these variations are considered a part of the claimed invention. Furthermore, although the execution of the flow diagram blocks is described with respect to the exemplary hardware architecture 100 and software architecture 200, execution of the flow diagram blocks may be implemented with other hardware and/or software architectures that provide the same features, functions, etc. in accordance with exemplary embodiments of the invention.

Exemplary embodiments of the invention can be implemented in hardware, software, or a combination of both. Those embodiments implemented in software may, for example, include firmware, resident software, microcode, etc. Exemplary embodiments of the invention may also be implemented as a computer program product accessible from a computer-usable or computer-readable medium providing program code for use by or in connection with a computer or other instruction execution system. In this regard, a computer-usable or computer-readable medium can be any apparatus that can contain, store, communicate, propagate, or transport the program for use in connection with the instruction execution system, apparatus, or device.

The computer-usable or computer-readable medium can be an electronic, magnetic, optical, electromagnetic, infrared, or semiconductor system (apparatus, device, etc.) or a propagation medium. Examples of a computer-readable medium include a semiconductor or solid state memory, magnetic tape, a removable computer diskette, a random access memory (RAM), a read-only memory (ROM), a rigid magnetic disk, or an optical disk. Some current examples of optical disks include compact disk-read only memory (CD-ROM), compact disk-read/write (CD-R/W), or digital video disk (DVD).

A data processing system suitable for storing and/or executing program code can include at least one processor coupled directly or indirectly to memory elements through a system bus. The memory elements can include local memory employed during actual execution of the program code, bulk storage, or cache memories that provide temporary storage of at least some program code to reduce the number of times the code needs to be retrieved from bulk storage during execution.

Input/output (I/O) devices (e.g., keyboards, displays, pointing devices, etc.) can be coupled to the data processing system either directly or through intervening I/O controllers. Network adapters may also be coupled to the data processing system to allow the system to be coupled to other data processing systems or remote printers or storage devices through intervening private or public networks. Telephonic modems, cable modems, and ethernet cards are a few examples of the currently available types of network adapters.

While exemplary embodiments of the invention have been described, it will be understood that those skilled in the art, both now and in the future, may make various improvements and enhancements which fall within the scope of the claims that follow. These claims should be construed to maintain the proper protection for the invention first described.

What is claimed is:

1. A method for encryption key management, the method comprising:
    accepting authenticated unencrypted data into a processor of a server computing device, wherein the authenticated unencrypted data is identified as authenticated and unencrypted by a label appended to the unencrypted data;
    the processor configured as a private key secure processor vault, the processor comprising a plurality of cores comprising at least one secure core and at least one non-secure core, the at least one secure core inaccessible for receiving data from or transmitting data to any of the at least one non-secure cores, thereby preventing unauthorized access to the processor and the data contents therein;
    encrypting the authenticated unencrypted data based on an existing private key stored in the processor, thereby converting it to encrypted data;
    transmitting the encrypted data out of the processor; and
    monitoring the entry of the authenticated unencrypted data into the processor and the exit of the encrypted data from the processor to insure a one-to-one correspondence of data-flow through the processor,
    wherein the processor is one of a plurality of synergistic processor cores integrated within a multi-core processor supervised by a primary processor core.

2. The method of claim 1, further wherein the label is represented by one or more bits included in the authenticated unencrypted data, and the label is removed before the authenticated unencrypted data is encrypted.

3. The method of claim 1, wherein transmitting the encrypted data includes transmitting the encrypted data to a client computing device via a communications network.

4. The method of claim 1, wherein, prior to encrypting the authenticated unencrypted data, the authenticated unencrypted data is processed by the execution of a program code also contained within the processor.

5. The method of claim 1, wherein the authenticated unencrypted data includes a re-key instruction to replace the existing private key, the method further comprising:
    generating a new private key;
    encrypting the new private key based on the existing private key; and
    transmitting the encrypted new private key to a client computing device via a communications network.

6. The method of claim 5, further comprising:
    accepting the encrypted new private key into a processor of the client computing device;
    decrypting the encrypted new private key with the existing private key, thereby obtaining the new private key;
    replacing the existing private key stored on the client computing device with the new private key; and
    destroying the existing private key stored on the client computing device.

7. The method of claim 5, further comprising:
    monitoring for the receipt of an acknowledgment transmitted from the client computing device to the server computing device to acknowledge the replacement of the existing private key with the new private key on the client computing device;
    assuming, in response to not receiving the acknowledgment, that the replacement of the existing private key with the new private key on the client computing device was unsuccessful and issuing a new re-key instruction from the server computing device to replace the existing private key; and
    assuming, in response to receiving the acknowledgment, that the replacement of the existing private key with the new private key on the client computing device was successful and destroying the existing private key in the processor of the server computer device.

8. A system for encryption key management, comprising:
    a server computing device including a processor configured as a private key secure processor vault that operates in isolation from other components of the server computing device, thereby preventing unauthorized access to the processor and the data contents therein;
    an encryption module operating within the processor and configured to accept authenticated unencrypted data into the processor, wherein the authenticated unencrypted data is identified as authenticated and unencrypted by a label appended to the unencrypted data;
    encrypt the authenticated unencrypted data to convert it to encrypted data, and transmit the encrypted data out of the processor;
    a key module operating within the processor in communications with the encryption module and configured to provide encryption key data to the encryption module for the encryption of the authenticated unencrypted data; and
    a monitoring module configured to monitor the entry of the authenticated unencrypted data into the processor and the exit of the encrypted data from the processor to insure a one-to-one correspondence of data-flow through the processor,
    wherein the processor is one of a plurality of synergistic processor cores integrated within a multi-core processor supervised by a primary processor core.

9. The system of claim 8, wherein:
    the encryption module is further configured to accept authenticated unencrypted data that includes a re-key instruction to replace an existing private key, encrypt a new private key based on the existing private key, and transmit the encrypted new private key to a client computing device via a communications network; and
    the key module is further configured to generate the new private key and provide existing private key data to the encryption module for encryption of the new private key.

10. The system of claim 9, wherein the client computing device includes a processor configured to accept the encrypted new private key, decrypt the encrypted new private key with the existing private key to obtain the new private key, replace the existing private key stored on the client computing device with the new private key, and destroy the existing private key stored on the client computing device.

11. The system of claim 9, wherein the key module is further configured to destroy the existing private key, and the system further comprises a monitoring module operating within the processor and configured to:
    monitor for the receipt of an acknowledgment transmitted from the client computing device to the server computing device to acknowledge the replacement of the existing private key with the new private key on the client computing device;

assume, in response to not receiving the acknowledgment, that the replacement of the existing private key with the new private key on the client computing device was unsuccessful and cause the server computing device to issue a new re-key instruction to replace the existing private key; and assume, in response to receiving the acknowledgment, that the replacement of the existing private key with the new private key on the client computing device was successful and signal the key module to destroy the existing private key in the processor of the server computer device.

12. A computer program product for encryption key management, comprising a non-transitory computer usable medium having a computer readable program stored thereon, wherein the computer readable program, when executed on a computer, causes the computer to:

accept authenticated unencrypted data into a processor of the computer, wherein the authenticated unencrypted data is identified as authenticated and unencrypted by a label appended to the unencrypted data;

wherein the processor is configured as a private key secure processor vault, the operation of which is isolated from other components of the computer, thereby preventing unauthorized access to the processor and the data contents therein;

encrypt the authenticated unencrypted data based on an existing private key stored in the processor, thereby converting it to encrypted data;

transmit the encrypted data out of the processor to a client computing device via a communications network; and monitor the entry of the authenticated unencrypted data into the processor and the exit of the encrypted data from the processor to insure a one-to-one correspondence of data-flow through the processor, wherein the processor is one of a plurality of synergistic processor cores integrated within a multi-core processor supervised by a primary processor core.

13. The computer program product of claim 12, further wherein the label is represented by one or more bits included in the authenticated unencrypted data, and the computer readable program, when executed on the computer, further causes the computer to remove the label from the authenticated unencrypted data.

14. The computer program product of claim 12, wherein the authenticated unencrypted data includes a re-key instruction to replace the existing private key, and the computer readable program, when executed on the computer, further causes the computer to:

generate a new private key;

encrypt the new private key based on the existing private key; and transmit the encrypted new private key to the client computing device via the communications network.

15. The computer program product of claim 14, wherein the computer readable program, when executed on the computer, further causes the computer to:

monitor for the receipt of an acknowledgment transmitted from the client computing device to the server computing device to acknowledge the replacement of the existing private key with the new private key on the client computing device;

assume, in response to not receiving the acknowledgment, that the replacement of the existing private key with the new private key on the client computing device was unsuccessful and issue a new re-key instruction to replace the existing private key; and assume, in response to receiving the acknowledgment, that the replacement of the existing private key with the new private key on the client computing device was successful and destroy the existing private key in the processor of the computer.

* * * * *